March 19, 1929.  C. C. NORRIS  1,706,314
LENS STRAP
Filed Oct. 22, 1927
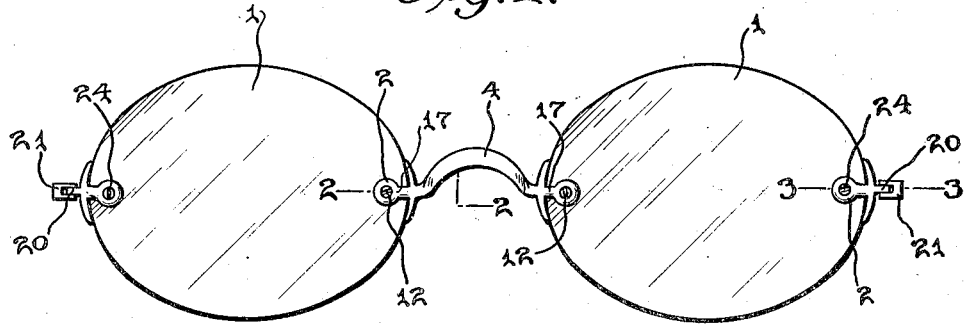
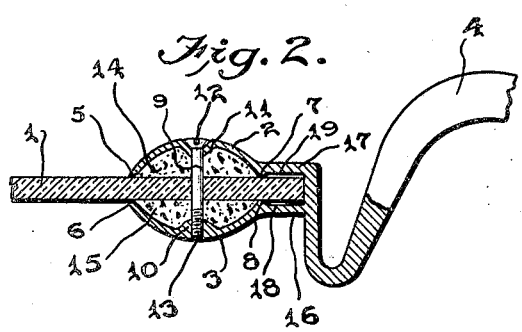
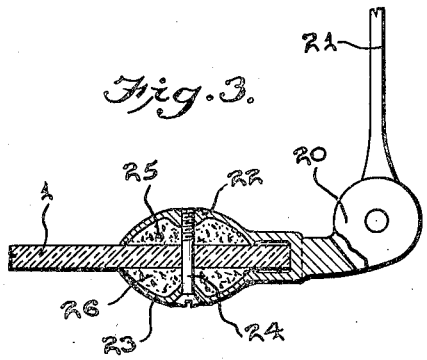
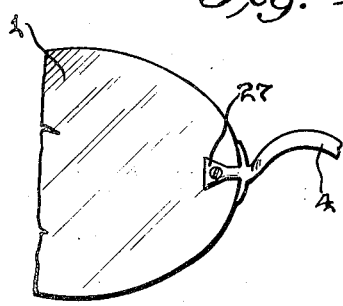
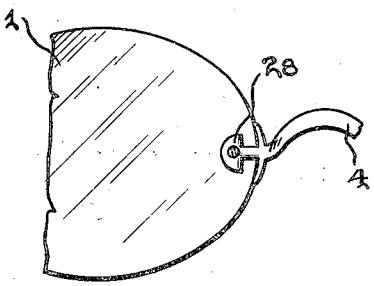
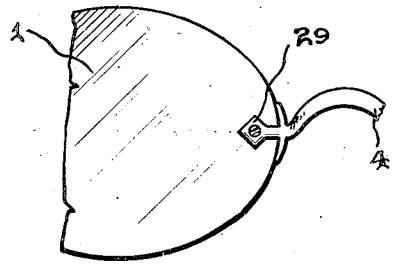
INVENTOR.
C. C. Norris
BY
Mason, Fenwick & Lawrence
ATTORNEYS Patented Mar. 19, 1929.

1,706,314

UNITED STATES PATENT OFFICE.

CHESTER C. NORRIS, OF LAGRANGE, GEORGIA.

LENS STRAP.

Application filed October 22. 1927. Serial No. 227,994.

This invention relates to improvements in mountings for lens in nose glasses and spectacles, and has particular reference to what are generally known as rimless mountings.

An object of this invention is to provide an improved strap or clamp, which will function to straddle the rimless lenses with the least possible metal contact bearing, between the lenses and strap material.

Another object of this invention is to provide a cushion for the strap, which will tend to relieve the strain between the lens and strap elements, due to the fact that it is necessary to clamp the straps to the faces of the lenses by a screw member which passes through the straps and lenses.

A further object of this invention is to provide a strap or clamp, which, when the screw member is drawn tight to the lenses, the strap will be so constructed that an even bearing of metal contact on the lenses will prevail, thereby preventing the strap material contact or pressure from breaking the lenses, the metal contact being some distance from the hole of the lens, and at the same time, the cushion will lend resistance to strain upon the lens.

Another object of this invention is to provide a cup shaped strap so constructed as to provide substantial reenforcement for the screw head, as well as the screw threads, thereby assuring positive and secure tightness, thus preventing the lenses from loosening.

Other objects of this invention will appear from the following detailed description and as disclosed in the single sheet of drawings which is herewith made a part of this application.

In the drawings—

Figure 1 illustrates a front elevational view of a pair of rimless spectacles showing the mounting in assembled relationship therewith.

Figure 2 represents to enlarged scale a cross sectional view of the mounting on a rimless lens as attached to the nose bridge of a pair of spectacles.

Figure 3 illustrates to enlarged scale a cross sectional view of the mounting on a rimless lens, as attached to the end piece or temporal side of a pair of spectacles.

Figure 4 represents a portion of a lens showing one form of strap attached thereto.

Figures 5 and 6 illustrate modified forms of the lens strap in this invention.

Numeral 1 designates lenses of any suitable type for use in eyeglasses or spectacles, preferably of the rimless kind, and adapted for receiving in mounted relationship thereon strap or clamp elements 2 and 3 for the purpose of holding the nose piece in position. The strap or clamp is formed cup shaped, as clearly shown in Figures 2 and 3, and in such a manner that the least possible metal contact will occur between the surface of the lens 1 and the bearing portions 5, 6, 7 and 8 of the strap elements 2 and 3. The nose piece 4 may be of any desirable structure and shape for either nose glasses or spectacles. It is preferred, however, that the strap portions 2 and 3 be either integrally formed with the nose piece, or otherwise, so that the lens 1 may be held firmly there-between by means of a clamping screw member 9. For this purpose, enlarged sections 10 and 11 are formed in the strap portions 2 and 3 for allowing the screw head 12 to be countersunk, and providing sufficient material for the threaded end of the screw to firmly hold in the strap portion 3. Cushion pads 14 and 15, preferably made of a cork substance yet rubber or any other suitable material may be used are placed in the cup shaped sections on each side of the lens, and are adapted to lie directly over the hole in the lens through which the screw 9 passes. The pads do not extend over the edges of the cups or straps, but are absolutely invisible when the straps and lens are in complete operative relationship to each other. In order to insure an efficient clamping effect for the strap portions 2 and 3, they are suspended by resilient extensions 16 and 17, which provide elasticity, and are spaced to clear the surface of the lens 1, as shown at 18 and 19.

Figure 3 illustrates a cup shaped strap adapted for holding the shank 20 and pivotally mounted spectacle arm or support 21 in operative relationship with the lens 1, the strap portions 22 and 23 in this instance being of a similar structure to those above described for holding the nose piece 4 in position, wherein numeral 24 designates the screw for firmly clamping the portions 22 and 23 to the lens 1, while the cushions 25 and 26 tend to relieve the strain on the lens 1.

Figures 4, 5 and 6 represent modifications of the invention in the particular shapes and structures of the strap clamping members as at 27, 28 and 29.

This invention provides an efficient lens strap particularly adapted for use in connection with the rimless lenses, in which the smallest possible metal contact is made between the lens surfaces and portions of the clamping members or straps. Furthermore, a cushion is provided within cup shaped strap elements, thereby tending to relieve strain on the lens when the clamping members are being actuated by the screw elements. The structure, according to this invention, makes it possible to have an even metal contact bearing on the lens, thereby preventing metal contact or pressure from breaking the lenses. Also the metal contact is at a considerable distance from the hole in the lens, as the cup shaped portion encircles it, and at the same time the cushion will lend resistance to the strain upon the lens. The cushion or pad being entirely secreted in the cup will make its appearance entirely invisible.

It is to be understood that alterations and substitutions may be made in the above disclosure within the scope of the appended claims without affecting the merits of this invention.

What I claim is:—

1. In a mounting for a lens, cup shaped, clamping members having the least possible bearing edges for contact with the lens, reenforcement portions in the clamping members, a screw extending through the reenforced portions and the lens for firmly clamping the mounting thereon, resilient extensions from the cup shaped members forming a loop over the edge of the lens, the upper and lower portions of the loop being spaced from the two main surfaces of the lens.

2. In a mounting for a lens, cup shaped, clamping members having the least possible bearing edges for contact with the lens, reenforcement portions in the clamping members, a screw extending through the reenforced portions and the lens for firmly clamping the mounting thereon, resilient extensions from the cup-shaped members forming a loop over the edge of the lens, the upper and lower portions of the loop being spaced from the two main surfaces of the lens, and pad portions within the cup shaped members for relieving strain on the lens, the pad portions being entirely enclosed by the clamping members.

In testimony whereof I affix my signature.

CHESTER C. NORRIS.